(12) United States Patent
Mankadi

(10) Patent No.: US 8,038,208 B2
(45) Date of Patent: Oct. 18, 2011

(54) BICYCLE SADDLE HEIGHT ADJUSTMENT APPARATUS

(75) Inventor: Yahel Mankadi, Tel Mond (IL)

(73) Assignees: Yahel Mankadi (IL); Yaniv Dromy (IL)

( * ) Notice: Subject to any disclaimer, the term of this patent is extended or adjusted under 35 U.S.C. 154(b) by 357 days.

(21) Appl. No.: 12/053,702

(22) Filed: Mar. 24, 2008

(65) Prior Publication Data

US 2009/0238635 A1  Sep. 24, 2009

(51) Int. Cl.
*B62J 1/00* (2006.01)

(52) U.S. Cl. ............... 297/215.13; 403/109.1; 403/110; 403/166

(58) Field of Classification Search ............ 403/109.1, 403/109.7, 110, 166; 297/215.1, 215.13, 297/195.1; 280/274, 281.1
See application file for complete search history.

(56) References Cited

U.S. PATENT DOCUMENTS

| 446,671 | A | * | 2/1891 | Elliott | 297/215.13 |
| 510,993 | A | * | 12/1893 | Riess | 297/215.13 |
| 4,150,851 | A | * | 4/1979 | Cienfuegos | 297/215.13 |
| 4,807,856 | A | * | 2/1989 | Teckenbrock | 297/344.18 |
| 4,872,696 | A |   | 10/1989 | Gill |  |
| 5,044,592 | A | * | 9/1991 | Cienfuegos | 297/215.13 |
| 5,195,803 | A | * | 3/1993 | Quintile | 403/109.7 |
| 6,478,278 | B1 |  | 11/2002 | Duncan |  |
| 6,585,215 | B2 | * | 7/2003 | Duncan | 297/215.13 |

FOREIGN PATENT DOCUMENTS

| DK | 194790 | 8/1990 |
| FR | 2774059 | 7/1999 |

* cited by examiner

*Primary Examiner* — Michael P Ferguson
(74) *Attorney, Agent, or Firm* — Cantor Colburn LLP

(57) ABSTRACT

A bicycle saddle height adjustment apparatus that is mounted on the frame of a bicycle, for adjusting the height of a bicycle saddle. The bicycle saddle comprises a seat post that supports a bicycle saddle and is adapted to fit telescopically within the seat tube of a bicycle frame; a height adjustment mechanism mounted on the seat tube of a bicycle, for adjusting the saddle height; and a spring connected between the seat post and the height adjustment mechanism. Actuating the height adjustment mechanism enables a cyclist to safely and quickly adjust the height of a bicycle saddle while continuously operating said bicycle.

5 Claims, 4 Drawing Sheets

BICYCLE SADDLE HEIGHT ADJUSTMENT APPARATUS

FIELD OF INVENTION

The present invention relates generally to bicycles, and more specifically to bicycle saddles.

BACKGROUND OF THE INVENTION

The key to an efficient, comfortable, and safe bicycle ride is a properly fitted bicycle. Frame size, the size, style, and positioning of the handlebars, the type of saddle (also known as a seat), and wheel size will all impact on the quality of the ride.

The height of the bicycle saddle is also important. A properly adjusted saddle supports the cyclist's full body weight and offers maximum pedaling efficiency. When properly adjusted, the saddle should prevent a cyclist from placing both feet flat on the ground when he is seated on the saddle. In fact, riding a bicycle with an improperly adjusted saddle can create a number of problems for the cyclist. Increased pressure on the arms, hands, and knees and decreased shock absorption may cause discomfort and pain, and can result in injuries.

Due to the importance of a properly adjusting the saddle height, cyclists may need to readjust the saddle height when riding up or down mountains and traveling over other challenging terrains.

For example, increasing the height of the saddle enables more efficient and powerful pedaling while further decreasing the strain to the leg muscles, which may be useful when going up hill.

Conversely, lowering the saddle provides a more stable ride, increases shock absorbency, and generally gives the cyclist greater control over the bicycle, which may be useful when riding downhill.

As discussed above, a cyclist may elect to adjust the height of the bicycle saddle in order to improve the riding experience as well as to adapt the bicycle to meets the needs dictated by local road or terrain conditions.

Currently, the most common method for adjusting the height of the saddle during a ride is for the cyclist to dismount, pull out the tools needed to move the saddle, make the desired adjustment, stow the tools, and finally remount the bicycle and continue riding.

However, the cyclist may prefer to minimize the time during which his ride would be interrupted. There are patents provided to simplify the process of adjusting the height of the saddle. Illustrative of such devices include FR2774059 and U.S. Pat. No. 6,478,278, incorporated by reference in their entirety herein, which describe saddle supports for a bicycle that enable manually adjusting the height of the saddle without tools, and DK Patent Number 194790, incorporated by reference in its entirety herein, which provides a seat tube for a bicycle saddle with a spring fitted below the seat tube that facilitates adjusting the height of the saddle. Additionally, there are patents that allow a cyclist to adjust the saddle height while operating the bicycle. For example, U.S. Pat. No. 4,872,696, incorporated by reference in its entirety herein, discloses a lever located by the handlebar grip for remotely adjusting the height of a bicycle saddle post, that includes an externally mounted spring.

SUMMARY OF THE INVENTION

The present invention discloses a bicycle saddle height adjustment apparatus that allows a cyclist to quickly and easily adjust the height of a saddle of a bicycle while the cyclist is mounted on and operating the bicycle, without interrupting the ride. Use of a bicycle saddle height adjustment apparatus of the present invention offers a measurable improvement in the quality and flow of the ride.

None of the above inventions and patents is seen to disclose a bicycle saddle height adjustment apparatus as will subsequently be described and claimed in the instant invention.

Accordingly, a bicycle saddle height adjustment apparatus of the present invention is provided, said device comprising a seat post adapted to fit telescopically within the seat tube of a bicycle frame and on which a bicycle saddle may be removably affixed; a height adjustment mechanism, operatively associated with the seat post and the bicycle frame, for adjusting the height of the saddle; and a spring for operatively engaging the seat post and the height adjustment mechanism. Actuating the height adjustment mechanism mounted on the seat tube of a bicycle equipped with a seat post of the present invention enables a cyclist to safely and quickly adjust the height of a bicycle saddle while continuously operating said bicycle Additionally, the seat post may be further equipped with an internally mounted pin affixed to the lower end of the seat post and around which the first end of the spring may be engaged. Additionally, at least one end of the pin may be affixed to the interior surface of the seat post by means of spot welding, a threaded fastener, industrial adhesive material, or other suitable means.

Additionally, the height adjustment mechanism may comprises a clamp releasably encircling an uppermost portion of the seat tube; a plate, preferably shaped as a disk, which may be positioned in the upper end of the seat tube and held securely in place with the clamp, with a notched aperture on which the second end of the spring may be engaged; and a lever, which may be operatively connected to the clamp, for releasing and securing the clamp.

Additionally, the seat post may be further equipped with a slotted, substantially straight channel extending the length of the seat post, that enables the seat post to travel up and down on the plate of the height adjustment mechanism.

Additionally, actuating the height adjustment mechanism and applying downward pressure on the bicycle saddle may enable the seat post to travel telescopically down within the seat tube, which action may expand the spring housed therein and lower the height of the saddle.

Additionally, actuating the height adjustment mechanism and removing downward pressure from the bicycle saddle may enable the seat post to travel telescopically up within the seat tube, which action may contract the spring housed therein and raise the height of the saddle.

Additionally, the bicycle frame may be, inter alia, a frame for a mountain bike, a touring bicycle, a hybrid bicycle, or a road bicycle.

Additionally, the seat post may be constructed from at least one of: aluminum, carbon fiber, steel, titanium, or other suitable materials.

BRIEF DESCRIPTION OF THE FIGURES

The subject matter regarded as the invention will become more clearly understood in light of the ensuing description of embodiments herein, given by way of example and for purposes of illustrative discussion of the present invention only, with reference to the accompanying figures, wherein.

Figure 1:
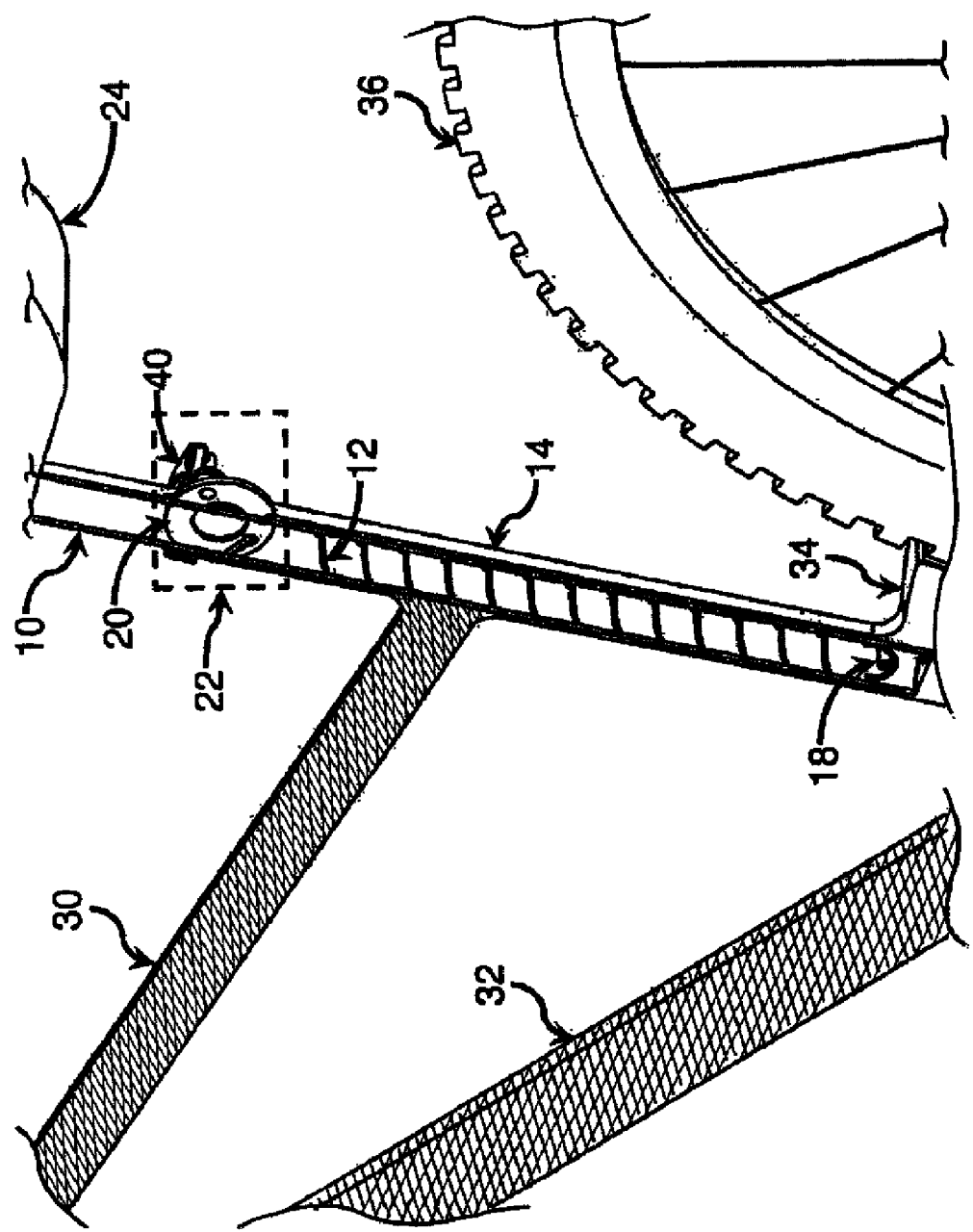
FIG. 1 is a perspective, cutaway view of a bicycle saddle height adjustment apparatus according to an embodiment of the present invention, wherein the spring is expanded and the saddle is raised.

The figures together with the description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SOME EMBODIMENTS OF THE INVENTION

The present invention discloses a bicycle saddle height adjustment apparatus that includes a novel seat post 10 and height adjustment mechanism 22, configured to allow a cyclist to adjust the height of a saddle 24 of a bicycle while the cyclist is mounted on and operating the bicycle. Embodiments of a bicycle saddle height adjustment apparatus are shown in FIGS. 1, 2, 3, and 4.

According to embodiments, a bicycle saddle height adjustment apparatus for adjusting the height of a bicycle saddle 24 may comprise a seat post 10, a height adjustment mechanism 22, and a spring 12, preferably an extension spring that operatively engages seat post 10 and height adjustment mechanism 22. Actuating height adjustment mechanism 22 that has been mounted on seat tube 14 of a bicycle equipped with a seat post 10 of the present invention enables a cyclist to safely and quickly adjust the height of bicycle saddle 24 without interrupting the continuous operation of said bicycle.

Embodiments of the present invention may be configured to operate with any type of bicycle frame including, inter alia, a frame for a mountain bike frame, a touring bicycle frame, a hybrid bicycle frame, and a road bicycle frame.

Typically, the frame of a bicycle comprises a number of tubular components. At the front of the frame are the handlebars (not shown), supported by a head tube (not shown). A seat tube 14 is located towards the center of the frame. The lower end of seat tube 14 joins the pedal mechanism (not shown). The upper end of seat tube 14 is configured to receive a seat post 10 and a saddle 24 (also called a seat). A slot is provided at the top end of seat tube 14 to enable tightening seat tube 14 on a seat post 10 disposed therein. A cross bar 30, a substantially horizontal component of the frame, connects between seat tube 14 and the head tube and handlebars at the front of the bicycle frame. A down tube 32 descends down from the head tube and handlebars to the lower part of seat tube 14. There is also a seat stay 34 that connects between a lower portion of seat tube 14 and the hub assembly of rear tire 36.

According to embodiments of the present invention, a seat post 10 is provided to support saddle 24. Seat post 10 is an elongate tubular member adapted to fit telescopically within a seat tube 14 of a bicycle frame. Seat post 10 of the present invention may be configured to accommodate the lengths, diameters and offset requirements of a plurality of seat tubes 14.

Saddle 24 may be removably affixed to the upper end of seat post 10 and secured to seat post 10 using known in the art technology. Varying the depth to which seat post 10 is seated in seat tube 14 enables adjusting the height of saddle 24.

Seat post 10 comprises a slotted channel 38, a pin 18, and a spring 12, preferably, an extension spring.

According to embodiments, seat post 10 may be constructed from any suitable materials, including, inter alia, aluminum, carbon fiber, steel, and titanium.

According to embodiments, seat post 10 may be equipped with a substantially straight, slotted channel 38 that extends the length of seat post 10. Slotted channel 38 may provide a path along which seat post 10 may travel up and down on plate 20 of height adjustment mechanism 22. According to such embodiments, the width of slotted channel 38 is sufficient to snuggly accommodate plate 20, which may also help prevent seat post 10 from rotating.

Spring 12 may be disposed axially within seat post 10 to operatively engage seat post 10 and height adjustment mechanism 22. A first end 16 of spring 12 may be affixed to the lower end of seat post 10. A second end 28 of spring 12 may be affixed to a height adjustment mechanism 22.

According to embodiments of the present invention, a pin 18 is provided for engaging a first end 16 of spring 12. Pin 18 may be affixed to the lower end of seat post 10, on the interior surface of seat post 10. At least one end of pin 18 may be secured in place on seat post 10 by any suitable securing means including, inter alia, spot welding, a threaded fastener, and industrial adhesive material.

First end 16 of spring 12 may be configured to engage pin 18. For example, first end 16 of spring 12 may be shaped like a hook and may be disposed such that first end 16 of spring 12 sits under pin 18 (as seen clearly in FIGS. 3 and 4)

According to embodiments of the present invention, a height adjustment mechanism 22 is provided for actuating adjustments to the height of saddle 24. Height adjustment mechanism 22 may be disposed to engage the uppermost end of seat tube 14. In addition to enabling adjusting the height of saddle 24, height adjustment mechanism 22 may also prevent the rotation of seat post 10 within seat tube 14.

According to embodiments, height adjustment mechanism 22 may comprise a plate 20 seated in the slot on the uppermost end of seat tube 14; a clamp 42 that releasably encircles an uppermost portion of seat tube 14 and holds plate 20 securely in place there; and a lever 40 for engaging and disengaging clamp 42.

According to embodiments of the present invention, actuating height adjustment mechanism 22 and applying a downward pressure to bicycle saddle 24 enables seat post 10 to travel telescopically down within seat tube 14, expanding spring 12 housed therein and lowering the height of saddle 24.

According to embodiments of the present invention, actuating height adjustment mechanism 22 and removing substantially all downward pressure from bicycle saddle 24 enables seat post 10 to travel telescopically up within seat tube 14, contracting spring 12 housed therein and raising the height of saddle 24.

Plate 20, a substantially flat piece, may be seated on its edge in the upper end of seat tube 14. Plate 20 may be disposed on seat tube 14 such that an edge of plate 20 may be seated in the existing slot of seat tube 14.

According to some embodiments of the present invention, plate 20 is formed and shaped such that it comprises a thicker portion and a thinner portion. The thicker portion is arranged to be located outside the tube whereas the thinner portion is arranged to be within the tube. According to such an embodiment, plate 20 may be positioned on seat tube 14 such that the thicker portion of plate 20 is external to seat tube 14 and seat post 10, as seen most clearly in FIG. 3.

Plate 20 may be further equipped with a notched aperture 26 into which second end 28 of spring 12 may be affixed. It is understood that other means may also be employed to secure second end 28 of spring 12 in place, without departing from the scope of the invention.

According to some embodiments of the present invention, plate 20 may also be operatively connected to a clamp 42.

Figure 3:
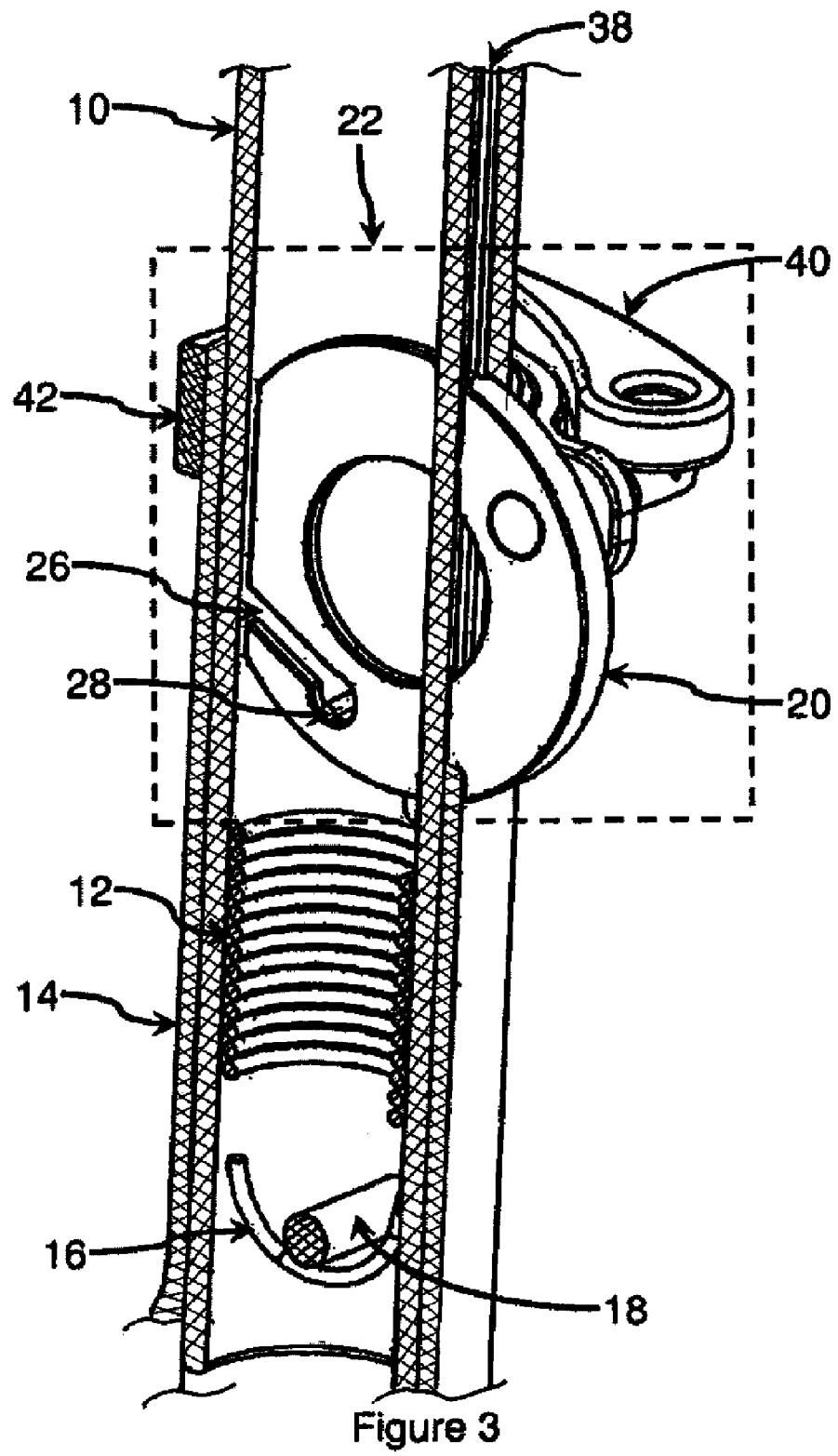
FIG. 3 is a perspective, cutaway of a bicycle saddle height adjustment apparatus according to an embodiment of the present invention, wherein the spring is compressed and the saddle is lowered.
Figure 4:
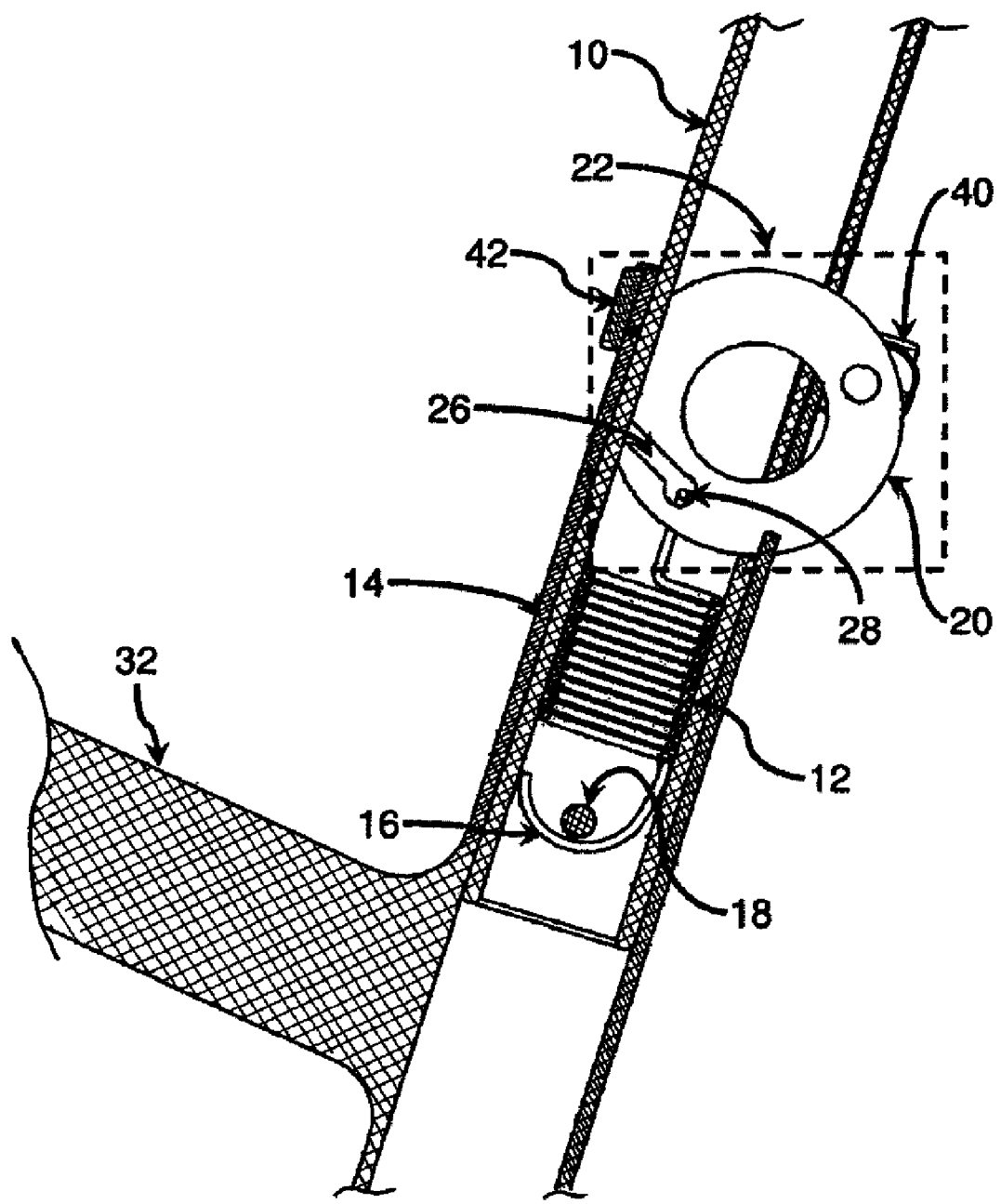
FIG. 4 is a front, cutaway view of the embodiment of FIG. 3.

According to embodiments of the present invention, a clamp 42 may be provided to secure height adjustment mechanism 22 in place on seat tube 14. Clamp 42 may be configured to releasably encircle an uppermost portion of seat tube 14, as seen in FIGS. 3 and 4.

According to some embodiments of the present invention, a lever 40 may be provided for releasing and securing clamp 42 of height adjustment mechanism 22.

According to some embodiments of the present invention, lever 40 may be, for example, a rotatable handle as is commonly found on quick release mechanisms for bicycles. It is understood that other methods may be provided for actuating height adjustment mechanism 22 without departing from the scope of the invention.

According to some embodiments, clamp 42, together with lever 40, may function similarly to a known in the art quick-release clamp, wherein releasing or rotating lever 40 loosens or releases clamp 42.

Embodiments of a seat post 24 according to the present invention are suitable for any type of bicycle frame, including, inter alia, mountain bikes, touring bicycles, and road bicycles.

According to some embodiments, the present invention may be installed on bicycle frames prior to sale. According to some other embodiments, the present invention may be supplied as a kit that minimally includes a seat post 10 and a height adjustment mechanism 22.

In order to more fully describe the present invention, the following describes a mode of use.

A cyclist mounted on a bicycle equipped with a bicycle saddle height adjustment apparatus of the present invention is able to operate bicycle saddle height adjustment apparatus by simply reaching down and actuating height adjustment mechanism 22. While height adjustment mechanism 22 is actuated, seat post 10 is able to travel freely.

According to some embodiments of the present invention, height adjustment mechanism 22 may be actuated by rotating lever 40 in order that clamp 42 may be released. Thus, the cyclist needs to, for example, rotate or depress lever 40.

With lever 40 rotated and clamp 42 released, seat post 10 is able to slide telescopically within seat tube 14. Once clamp 42 has been released and seat post 10 is able to slide freely, the cyclist is able to adjust the height of saddle 24.

Figure 2:
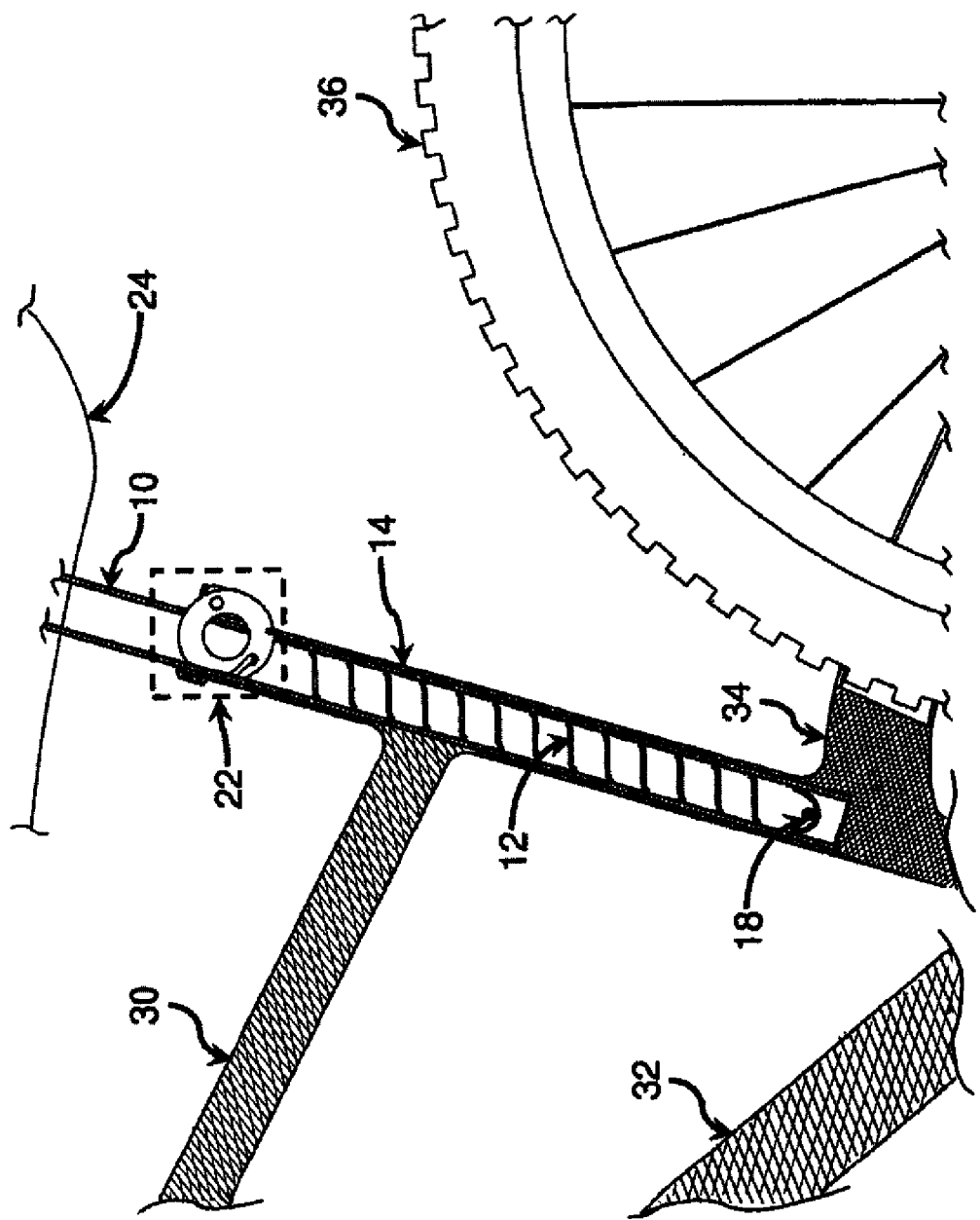
FIG. 2 is a front, cutaway view of the embodiment of FIG. 1.

If the cyclist would like to lower saddle 24, a downwards force, such as may be generated by a cyclist resting his weight on a saddle 24 while operating a bicycle, needs to be applied to seat post 10. The weight of the cyclist provides sufficient downward force to expand spring 12 and lower saddle 24, allowing the cyclist to adjust saddle 24 down to the desired height. As spring 12 expands, seat post 10 is able to slide telescopically down into seat tube 14, as can be seen in FIGS. 1 and 2.

If, on the other hand, the cyclist would like to raise saddle 24, he simply needs to redistribute his weight such that he is no longer applying downward force on seat post 10. With no or little downward force being applied on seat post 10, the stored energy in extension spring 12 may be released. As spring 12 compresses, seat post 10 is able to slide telescopically up from seat tube 14, as can be seen in FIGS. 1 and 2. Thus, the compressing motion of spring 12 enables increasing the height at which saddle 24 is positioned.

During the up and down movement of seat post 10, clamp 42 and plate 20 remain stationary. Slotted channel 38 on seat post 10 allows seat post 10 to slide past plate 20 without interference.

When saddle 24 has reached the desired height, the cyclist may rotate lever 40 back to a locked position which in turn closes clamp 42. Closing clamp 42 holds seat post 10 securely and safely in place.

Throughout the entire adjustment activity, which requires only a few seconds to execute, the cyclist is able to continue operating his bicycle. It is understood that the height of saddle 24 may also be adjusted while the bicycle is not being ridden.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

It is to be understood that an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions.

It is understood that the phraseology and terminology employed herein is not to be construed as limiting and is for descriptive purpose only.

The principles and uses of the teachings of the present invention may be better understood with reference to the accompanying description, figures and examples.

It is to be understood that the details set forth herein should not be construed as limiting any applications of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, integers or groups thereof and that the terms are not to be construed as specifying components, features, steps or integers.

The phrase "consisting essentially of", and grammatical variants thereof, when used herein, is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not to be construed as there being only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" refers to manners, means, techniques and procedures for accomplishing a given task including, but is not limited to those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

What is claimed is:

1. A bicycle saddle height adjustment apparatus mounted on a frame of a bicycle, for adjusting a height of a bicycle saddle, said bicycle saddle height adjustment apparatus comprising:
   a seat post fit telescopically within a seat tube of the bicycle frame and on which a bicycle saddle is removably affixed;
   a height adjustment mechanism, operatively associated with the seat post and the bicycle frame, for adjusting the height of the saddle; and
   a spring for operatively engaging the seat post and the height adjustment mechanism; wherein actuating the height adjustment mechanism enables a cyclist to safely and quickly adjust the height of a bicycle saddle while continuously operating said bicycle;
   wherein the seat post is further equipped with an internally mounted pin affixed to a lower end of the seat post and around which a first end of the spring is engaged;
   wherein the height adjustment mechanism comprises:
      a clamp releasably encircling an uppermost portion of the seat tube;
      a plate, which is positioned in an upper end of the seat tube and held securely in place with the clamp, with a notched aperture on which a second end of the spring is engaged; and
      a lever operatively connected to the clamp for releasing and securing the clamp;
   wherein the seat post is further equipped with a slotted, substantially straight channel extending a length of the seat post, that enables the seat post to travel up and down on the plate of the height adjustment mechanism; and
   wherein the spring is biased towards an unexpanded position such that releasing the clamp of the height adjustment mechanism and removing downward pressure from the bicycle saddle enables the seat post to travel telescopically up within the seat tube, contracting the spring housed therein toward the unexpanded position and raising the height of the saddle.

2. The bicycle saddle height adjustment apparatus of claim 1, wherein releasing the clamp of the height adjustment mechanism and applying downward pressure on the bicycle saddle enables the seat post to travel telescopically down within the seat tube, expanding the spring housed therein and lowering the height of the saddle.

3. The bicycle saddle height adjustment apparatus of claim 1, wherein the bicycle frame is a frame for at least one of a mountain bike, a touring bicycle, a hybrid bicycle, and a road bicycle.

4. The bicycle saddle height adjustment apparatus of claim 1, wherein the seat post is made of at least one of: aluminum, carbon fiber, steel, and titanium.

5. The bicycle saddle height adjustment apparatus of claim 1, wherein at least one end of the pin is affixed to an interior surface of the seat post by at least one of spot welding, a threaded fastener, and industrial adhesive material.

* * * * *